(12) United States Patent
Ore et al.

(10) Patent No.: US 8,289,925 B2
(45) Date of Patent: Oct. 16, 2012

(54) SELF OPTIMIZATION OF FORBIDDEN NEIGHBOR CELL LIST

(75) Inventors: Ivan Ore, Nummela (FI); Leping Huang, Tokyo (JP)

(73) Assignee: Nokia Corporation, Espoo (FI)

( * ) Notice: Subject to any disclaimer, the term of this patent is extended or adjusted under 35 U.S.C. 154(b) by 210 days.

(21) Appl. No.: 12/527,651

(22) PCT Filed: Feb. 22, 2008

(86) PCT No.: PCT/IB2008/000402
§ 371 (c)(1),
(2), (4) Date: Jun. 14, 2010

(87) PCT Pub. No.: WO2008/102252
PCT Pub. Date: Aug. 28, 2008

(65) Prior Publication Data
US 2010/0278161 A1    Nov. 4, 2010

Related U.S. Application Data

(60) Provisional application No. 60/902,856, filed on Feb. 23, 2007.

(51) Int. Cl.
*H04W 4/00* (2009.01)
*H04W 36/00* (2009.01)
*H04B 17/00* (2006.01)
*H04L 12/56* (2006.01)
*H04M 1/66* (2006.01)

(52) U.S. Cl. ............. 370/331; 370/338; 455/67.11; 455/410; 455/422.1; 455/436; 455/446

(58) Field of Classification Search .......... 370/331, 370/338; 455/67.11, 410, 422.1, 436, 446
See application file for complete search history.

(56) References Cited

U.S. PATENT DOCUMENTS

| | | | | |
|---|---|---|---|---|
| 5,722,072 | A * | 2/1998 | Crichton et al. | 455/437 |
| 5,722,073 | A * | 2/1998 | Wallstedt et al. | 455/437 |
| 5,982,758 | A * | 11/1999 | Hamdy | 370/331 |
| 6,119,005 | A * | 9/2000 | Smolik | 455/436 |
| 6,360,098 | B1 * | 3/2002 | Ganesh et al. | 455/436 |

(Continued)

FOREIGN PATENT DOCUMENTS
EP    1286561 A1 *  2/2003

OTHER PUBLICATIONS

International Search Report and Written Opinion of the International Searching Authority from PCT Application No. PCT/IB2008/000402, dated Jul. 24, 2008, 11 pages.

(Continued)

*Primary Examiner* — Alpus H Hsu
(74) *Attorney, Agent, or Firm* — Squire Sanders (US) LLP

(57) ABSTRACT

An apparatus includes an analyzer configured to collect measurements and statistics from a cell of a plurality of cells, a key generator configured to generate a key indicator based on the measurements and statistics collected from the cell against predetermined conditions or thresholds to identify at least one other cell failing to meet the predetermined conditions or thresholds, and a forbidden neighbor cell list generator configured to automatically generate a forbidden neighbor cell list identifying the at least one other cell failing to meet the predetermined conditions or thresholds and notifying the at least one other cell.

18 Claims, 5 Drawing Sheets

U.S. PATENT DOCUMENTS

| | | | |
|---|---|---|---|
| 6,421,328 B1* | 7/2002 | Larribeau et al. | 370/329 |
| 6,546,251 B1* | 4/2003 | Dalsgaard et al. | 455/437 |
| 7,003,297 B2* | 2/2006 | Willars et al. | 455/436 |
| 7,013,141 B2* | 3/2006 | Lindquist et al. | 455/435.1 |
| 7,050,803 B2* | 5/2006 | Celedon et al. | 455/436 |
| 7,062,271 B2* | 6/2006 | Choi | 455/434 |
| 7,136,638 B2* | 11/2006 | Wacker et al. | 455/424 |
| 7,203,512 B2* | 4/2007 | Jeong et al. | 455/522 |
| 7,257,406 B2* | 8/2007 | Ji | 455/450 |
| 7,308,259 B2* | 12/2007 | Madsen | 455/434 |
| 7,313,116 B2* | 12/2007 | Lee et al. | 370/335 |
| 7,376,104 B2* | 5/2008 | Diachina et al. | 370/332 |
| 7,437,164 B2* | 10/2008 | Agrawal et al. | 455/446 |
| 7,483,702 B2* | 1/2009 | Yeo et al. | 455/449 |
| 7,548,752 B2* | 6/2009 | Sampath et al. | 455/447 |
| 7,596,378 B1* | 9/2009 | Nizri et al. | 455/448 |
| 7,924,788 B2 | 4/2011 | Ore | |
| 8,032,157 B2* | 10/2011 | Dalsgaard et al. | 455/456.4 |
| 2002/0168982 A1* | 11/2002 | Sorokine et al. | 455/442 |
| 2004/0121773 A1 | 6/2004 | O'Brien | |
| 2004/0157600 A1* | 8/2004 | Stumpert et al. | 455/432.1 |
| 2005/0048974 A1 | 3/2005 | Kim et al. | |
| 2005/0096062 A1* | 5/2005 | Ji et al. | 455/450 |
| 2006/0084443 A1 | 4/2006 | Yeo et al. | |
| 2007/0184834 A1* | 8/2007 | Jeong et al. | 455/434 |
| 2007/0254656 A1* | 11/2007 | Dalsgaard | 455/435.1 |
| 2008/0113670 A1* | 5/2008 | Dufour et al. | 455/436 |
| 2008/0132225 A1 | 6/2008 | Ranta et al. | |
| 2008/0167041 A1* | 7/2008 | Wang et al. | 455/436 |
| 2008/0207195 A1 | 8/2008 | Ranta et al. | |
| 2008/0253319 A1* | 10/2008 | Ji et al. | 370/328 |
| 2008/0280604 A1 | 11/2008 | Ore et al. | |

OTHER PUBLICATIONS

Olofsson et al, "A concept for dynamic neighbor cell list planning in a cellular system", Personal, Indoor and Mobile Radio Communications, 1996, PIMRC'96, Seventh IEEE International Symposium on Taipei, Taiwan, Oct. 1996, vol. 1.

* cited by examiner

SELF OPTIMIZATION OF FORBIDDEN NEIGHBOR CELL LIST

RELATED APPLICATION

This application was originally filed as PCT Application No. PCT/Ib2008/000402 filed on Feb. 22, 2008 and claims priority to U.S. application Ser. No. 60/902856 filed on Feb. 23, 2007.

BACKGROUND OF THE INVENTION

1. Field of the Invention

The present invention relates to an apparatus and method of self-optimization for a forbidden neighbor cell list.

2. Description of the Related Art

The optimization of the neighbor cell list (NCL) is one of the most important optimization processes that operators have to deal with in order to provide continuous mobility and good quality service. Typically, the neighbor cell list is defined manually by operators based on simulations and field trials. The target is to include potential candidate cells for mobility in idle mode and dedicated mode.

In global system for mobile communication (GSM) enhanced data rates for global evolution (EDGE) radio access network (GERAN) and universal mobile telecommunications system (UMTS) terrestrial radio access network (UTRAN), an operator has the control of a neighbor cell list. Thus, if a target cell is not performing well, the operator can take this neighbor cell out of the neighbor cell list. By doing so, a network element, such as a user equipment (UE), will not report the bad neighbor cell anymore. In addition, filtering mechanisms can be applied so that only the neighbor cells with the strongest radio conditions are reported by the UE. However, filtering cannot address all of the potential problems related to handover performance.

In some second generation (2G) and third generation (3G) inter-working networks, the neighbor cell list is optimized (or generated) in order to provide good service for the normal user/customer. It may be part of the network policy to have some users (e.g., roaming) using different rules than the general. In a very specific example, the operator might want to limit some users' access to certain cells or other radio access network (RAN).

In 3GPP RAN2, some ongoing discussions contemplate whether NCL is to be used or not. In addition, due to the time consuming process in updating the neighbor cell list, some self-optimization procedures has been proposed in GERAN and UTRAN and in perhaps in other systems. Forbidden neighbor cell list (FNCL) or also known as the "black list" is one feature for handling mobility in Evolved UTRAN (E-UTRAN). The black or forbidden list contains a list of neighbor cells that UE should not take into considerations for cell reselection or handover purposes. However, the state of the art does not provide any good solutions for mechanisms how to self-optimize (define the list of neighbors) in the FNCL.

SUMMARY OF THE INVENTION

In accordance with an embodiment of the present invention, there is provided an apparatus, including an analyzer configured to collect measurements and statistics from a cell of a plurality of cells. The apparatus includes a key generator configured to generate a key indicator based on the measurements and statistics collected from the cell against predetermined conditions or thresholds to identify at least one other cell failing to meet the predetermined conditions or thresholds. The apparatus also includes a forbidden neighbor cell list generator configured to automatically generate a forbidden neighbor cell list identifying the at least one other cell failing to meet the predetermined conditions or thresholds and notifying the at least one other cell.

In accordance with an embodiment of the present invention, there is provided an apparatus, including analyzing means for collecting measurements and statistics from a cell of a plurality of cells. The apparatus includes key generating means for generating a key indicator based on the measurements and statistics collected from the cell against predetermined conditions or thresholds to identify at least one other cell failing to meet the predetermined conditions or thresholds. The apparatus also includes forbidden neighbor cell list generating means for automatically generating a forbidden neighbor cell list identifying the at least one other cell failing to meet the predetermined conditions or thresholds and notifying the at least one other cell.

In accordance with an embodiment of the present invention, there is provided a method, including collecting measurements and statistics from a cell of a plurality of cells, and generating a key indicator based on the measurements and statistics collected from the cell against predetermined conditions or thresholds to identify at least one other cell failing to meet the predetermined conditions or thresholds. The method also includes automatically generating a forbidden neighbor cell list identifying the at least one other cell failing to meet the predetermined conditions or thresholds and notifying the at least one other cell.

In accordance with an embodiment of the present invention, there is provided a computer program embodied on a computer readable medium, the computer program being configured to control a processor to perform collecting measurements and statistics from a cell of a plurality of cells, and generating a key indicator based on the measurements and statistics collected from the cell against predetermined conditions or thresholds to identify at least one other cell failing to meet the predetermined conditions or thresholds. The computer program also includes automatically generating a forbidden neighbor cell list identifying the at least one other cell failing to meet the predetermined conditions or thresholds and notifying the at least one other cell.

In accordance with an embodiment of the present invention, there is provided a system, including a plurality of cells configured to communicate with operations and maintenance of a network and provide communication service for a number of network elements. The system includes a self-optimization controller configured to collect measurements and statistics from a cell of a plurality of cells, configured to generate a key indicator based on the measurements and statistics collected from the cell against predetermined conditions or thresholds to identify at least one other cell failing to meet the predetermined conditions or thresholds, and configured to automatically generate a forbidden neighbor cell list identifying the at least one other cell failing to meet the predetermined conditions or thresholds and notifying the at least one other cell.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

Figure 1:
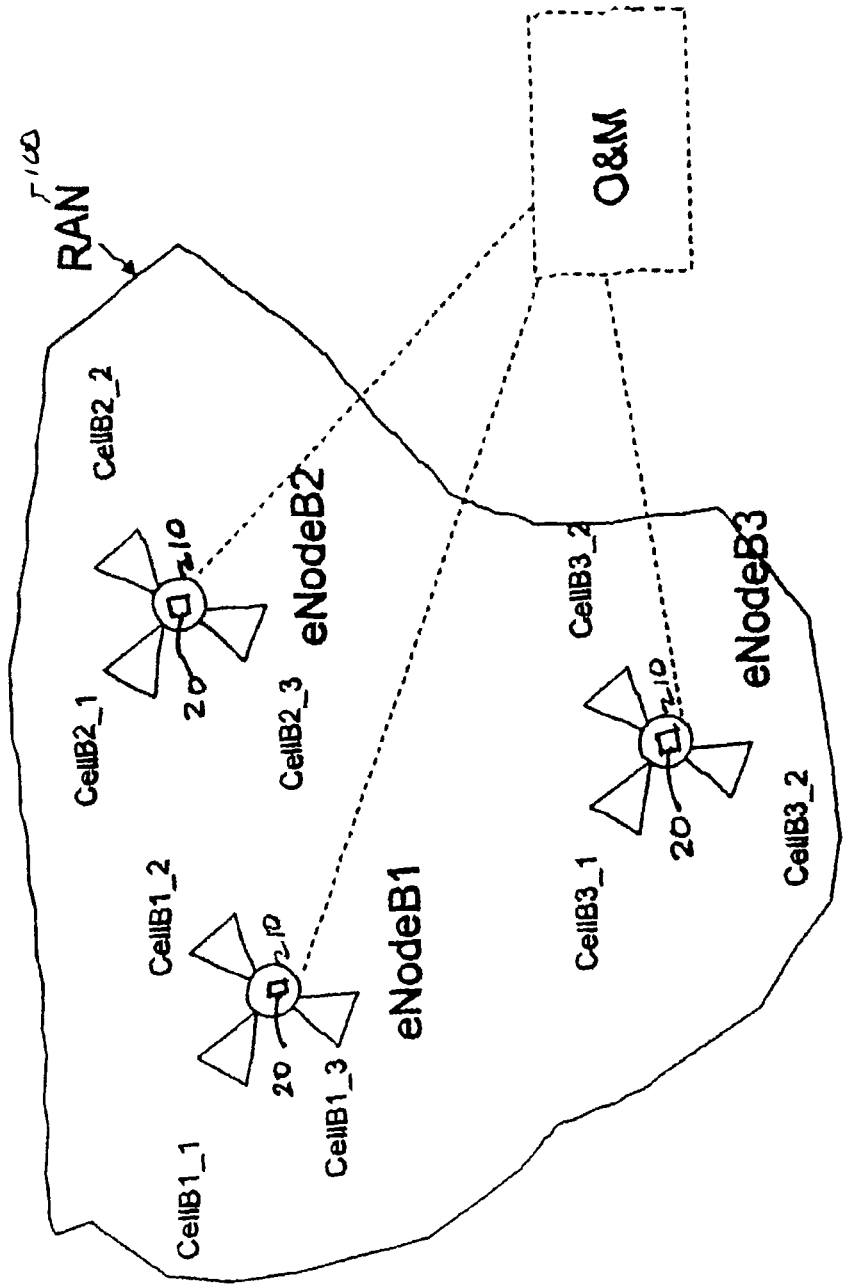
FIG. 1 illustrates a radio access network according to E-UTRAN (evolved UTRAN) which is specified in 3GPP release 8, in accordance with an embodiment of the present invention.

Reference will now be made in detail to preferred embodiments of the present invention, examples of which are illustrated in the accompanying drawings. The embodiments of the present invention described below provide an apparatus, a system, and a method to self-optimize a forbidden neighbor cell list (FNCL). A FNCL includes a list of cells sent to a network element, for instance, a user equipment (UE). The UE would not report those bad neighbor cells in the list to a network but may or may not be considered by the UE for measurement purposes only. The self-optimization of the FNCL includes building a list of neighbor cells in an autonomous and/or automatic manner, requiring or not requiring human intervention. In accordance with an exemplary embodiment of the present invention, autonomous may include an apparatus, a system, a method, or a mechanism not controlled by human or other or by an outside element or components, independent, or self-directing. In accordance with an exemplary embodiment of the present invention, automatic may include an apparatus, a system, a method, or a mechanism acting or operating in a manner essentially independent of external influence or control, self-regulating.

Furthermore, the embodiments of the present invention described below provide an apparatus, a system, and a method to integrate a self-optimization of the FNCL with a self-optimization of intra-frequency neighbor cell list (NCL), if any, inter-frequency, and inter-radio access technology (RAT) NCL to optimize handover (HO) performance and signaling overhead on broadcast control channel (BCCH).

In typical cellular networks, a UE can monitor surrounding cells that belong to a neighbor cell list provided by the network. The neighbor cell list can be broadcasted via system information (SI) and the UE can use this list to measure cells during idle mode and dedicated mode. The neighbor cell list can be created by the operator based on radio network planning.

In third generation partnership project (3GPP) release 6, it is possible that the UE can monitor other cells not included in the neighbor cell list. However, the neighbor cell list can still be used.

Mobility in E-UTRAN might not rely on the neighbor cell list. In such a case, the UE can be responsible for finding cells and reporting to the network. Consequently the signaling load can increase and also the handover (HO) performance can be degraded for the cases in which the target cell proposed by the UE is not good.

Certain embodiments of the present invention, therefore, provide a self-optimizing procedure that builds a list of neighbor cells in an autonomous and/or automatic manner, requiring or not requiring human intervention on its decision performance by providing a list of forbidden cells for which the UE does not have to search and/or report.

Not using a neighbor cell list in E-UTRAN may provide the benefit of reduced SI load and reduced radio network planning efforts. However, there may be trade-offs to such an approach, including HO performance degradation, unnecessary signaling increase, increased UE load and complexity, network boundary issues, and country boundary issues.

HO performance degradation may be characterized in that not all the neighbor cells reported by UE will be good target cells for handovers. Unsuccessful handovers may be due to high load in a target cell, high levels of interference, hardware (HW) problems, and the like. Certain conditions can be checked by the source cell before handover (e.g., verifying the load in the target cell). Not all the conditions, however, can be verified. For example, HW problems in the target cell cannot easily be verified.

Unnecessary signaling increase in the air interface may be characterized in that even if certain neighbor cells are bad neighbors from the handover performance point of view, the UE can continue reporting those cells to the network. Thus, signaling load can increase unnecessarily.

Increased UE load and complexity can be characterized in that, if the UE does not have any prior neighbor cell information, there can be situations in which the UE can either extraneously report a cell from a non-serving public land mobile network (PLMN) or, in order to prevent this, further identify the cells. The consequence of this dilemma can be that a measurement report might be loaded with cells outside the serving PLMN, which may result in reduced mobility performance, or the UE may have to further identify found cells, which may result in increased UE load and complexity.

In certain cases, it can be desirable to restrict the UE to measure certain cells. For example, operators sharing the network may decide which cells should not be reported by UEs. Near country borders, for example, it may also be desirable that the UE not measure and report cells from other operators in the neighboring country. This can pose challenges if an NCL is not used.

Furthermore, in scenarios such as country borders, the UE may not be able to distinguish between cells from different operators. In such cases there may be unnecessary reporting of cells.

The HO performance degradation, unnecessary increase of the signaling load, and increased UE complexity and load can be avoided, ameliorated, or reduced by use of a forbidden neighbor cell list (FNCL). The FNCL can be an operator configurable list in which the operator can group all or some portion of the bad neighbor cells.

The bad neighbor cells can be those cells about which an operator does not want the UE to measure, search, or report. There is no absolute requirement that the bad neighbor cells have bad equipment or other negative characteristics—they may be simply undesirable in the view of the operator because they are, for example, in another country or operated by another operator. Thus, the characterization of what is a bad neighbor cell may be defined by the operator's requirements.

By making the UE aware of the FNCL, the operator can ensure that the UE will not attempt to measure and report those cells to the network. In addition, the operator can ensure that the UE will not use the neighbors on the FNCL for reselection mobility when in RRC_IDLE.

The FNCL can be implemented as a table stored in an enhanced Node B (eNodeB) or other node having base station functionality or at operations and maintenance (O&M). The FNCL can include a list of neighbor cells that should not be measured by the UE. In addition, if common or default parameters for idle and dedicated mode operation are used, the FNCL can be used to include a list of exceptional configurations. For example, the FNCL can identify neighbor cells with special parameters to be considered in idle/dedicated mode. The FNCL may be optimized for a cell or each cell in the selected nodes.

Certain embodiments of the present invention, therefore, provide defining, building or generating the FNCL in an autonomous and/or automatic manner and can be transmitted via the SI or in dedicated mode. Even if the FNCL is sent via SI, the added SI load may not be as high as the traditional NCL. Another implementation can be to send the NCL list in dedicated mode via radio resource control (RRC) signaling.

An FNCL can be used for intra-frequency/inter-frequency and inter-radio access technology (RAT) measurements. Infra-frequency measurements are measurements on downlink physical channels at the same frequency as the active set. A measurement object corresponds to one cell. Inter-frequency measurements are measurements on downlink physical channels at frequencies that differ from the frequency of the active set. A measurement object corresponds to one cell. Inter-RAT measurements are measurements on downlink physical channels belonging to another radio access technology than UTRAN, such as, GSM. A measurement object corresponds to one cell.

Furthermore, an FNCL can be implemented as a list of cells collected and maintained by a UE based on well defined rules in 3GPP.

Thus, particularly when, for example, an NCL is not used, an FNCL can be used as a way to provide the network operator with some capability to control the signaling load and target cells for handovers. Thus, HO performance degradation, unnecessary increase of the signaling load, and increased UE complexity and load that may occur without an NCL can be avoided by use of forbidden neighbor cell list (FNCL).

FIG. 1 shows a radio access network 100 according to UTRA-UTRAN Long Term Evolution (LTE) and 3GPP System Architecture Evolution (SAE), in accordance with an embodiment of the present invention. The network 100 includes a plurality of cells (CellB1_1, CellB1_2, CellB1_3, CellB2_1, CellB2_2, CellB2_3, CellB3_1, CellB3_2, CellB3_3) communicating with the O&M and provide communication service for a number of terminals incorporating the self-optimization procedure for the FNCL, in accordance with an embodiment of the present invention. Terminals are typically dispersed throughout the system. A terminal may be fixed or mobile and may also be referred to as network element, a mobile station (MS), mobile equipment (ME), user equipment (UE), a wireless communication device, or some other terminology. A plurality of eNodeBs (eNodeB1, eNodeB2, and eNodeB3) are included in the network 100. All the radio related signaling (RRC) as well as all layers of retransmission are located in eNodeB.

Certain embodiments of the present invention may have applicability to communication networks and particularly wireless communication networks. More specifically, certain embodiments of the present invention may relate to universal mobile telecommunications system (UMTS) terrestrial radio access network (UTRAN) long term evolution (LTE) and evolved UTRAN (E-UTRAN).

A typical LTE/SAE network may include two types of network elements supporting the user and control planes. The first may be an enhanced base station, so called "evolved NodeB (eNodeB)" per 3GPP standards. This enhanced eNodeB provides the LTE air interface and performs radio resource management for the evolved access system. The second is the new access gateway (AGW). The AGW provides termination of the LTE bearer. It also acts as a mobility anchor point for the user plane. It implements key logical functions including MME (mobility management entity) for the control plane and SAE PDN GW (system architecture evolution packet data network gateway) for the user plane. These functions may be split into separate physical nodes, depending on the vendor-specific implementation.

A radio network controller (RNC) 10 can be configured to perform measuring of cells that are identified by the forbidden neighbor cell list. The RNC 10 may be configured to identify as bad neighbor cells those cells that correspond to the forbidden neighbor cell list. The RNC 10 would avoid reporting of those cells that are identified by the forbidden neighbor cell list.

Furthermore, the eNodeB or the RNC 10 may compare a known cell to a table of cells in the forbidden neighbor cell list. The eNodeB or the RNC 10 may also compare a known cell to a rule in the forbidden neighbor cell list. The forbidden neighbor cell list may be configured to identify a group of all bad neighbor cells, as defined by an operator of the network 100 to which the user equipment is connected.

The forbidden neighbor cell list may include those cells that have hardware problems. The forbidden neighbor cell list can also include those cells that are in a different country than the user equipment. The forbidden neighbor cell list can additionally includes those cells outside a serving public land mobile network. The forbidden neighbor cell list can also include those cells to which handover should not be made. The forbidden neighbor cell list can further include those cells that belong to an operator that is different from an operator corresponding to the user equipment. The forbidden neighbor cell list can also be used to deliver neighbor cell specific configuration to the user equipment. The forbidden neighbor cell list can also include user specific (such as, for example, international mobile subscriber identity (IMSI)) or subscription specific information so that it can be possible that different user equipments can have different respective forbidden neighbor cell lists.

The RNC 10 analyzes at least one cell of a plurality of cells and collects measurements and statistics to form the FNCL self-optimization. In accordance with an embodiment of the present invention, the initial measurements can be collected in a FNCL of size zero or with an initial FNCL defined by operator. Key indicators are then generated.

Initial measurements are measurements needed by the self-optimization procedure. Part of these measurements includes a key indicator, which is a performance indicator collected during call establishment and during dedicated mode. The key indicator refers to performance statistics or success in meeting predetermined conditions or thresholds on different layers: L2, RRC, access bearer for different kind of services. Some examples of performance indicators: radio resource control (RRC) radio link failure, dropped calls, etc. The key indicator is processed or determined by at least one eNodeB or other network node and delivered to a self-optimization controller 20 or entity which can be located in the at least one eNodeB, in the RNC 10, or in O&M. For illustrative purposes, the self-optimization controller 20 will be described as being located in at least one RNC 10 as illustrated in FIG. 1.

Based on the key indicator or a combination of multiple key indicators associated with at least one cell, the self-optimization controller 20 processes predefined rules, algorithms, and thresholds and/or a combination thereof to identify at least one cell that does not perform well in the network. The rules and algorithms belong to the FNCL self-optimization block in the self-optimization controller 20 (i.e., -----<measurements (performance indicators, operator's preferences)---< [self-optimization FNCL block]--------<optimized FNCL (new cells to be added, cells to be deleted from FNCL)). The block considers the identify the potential cells that do not perform well and estimate the optimized FNCL. In addition, operator's preferences may be also included in the FNCL that are, for example, cells that the operator wants to keep in the FNCL. This gives instructions to the self-optimization block for not deleting that particular cell out from the FNCL.

The self-optimization controller 20 may output a signal to the at least one cell meeting the predetermined conditions or thresholds and a signal to the at least one cell not meeting the predetermined conditions or thresholds. In an event that the self-optimization algorithms were not running at eNodeB, the selected cells may be manually added to the FNCL and manually sent to each cell that was analyzed and included in the FNCL.

The self-optimization controller 20 may also include a procedure to delete some cells from the neighbor cell list when an algorithm and/or rules determine and/or define that there is potential in that cell to work as a candidate for handovers and cell reselection. Therefore, the self-optimization controller 20 may be configured to analyze at least one of the cells in the neighbor cell list and collect the measurements and statistics at predetermined time intervals or continuously. The self-optimization controller 20 may be further configured to automatically update the neighbor cell list by automatically generating the FNCL to include at least one cell meeting the predetermined conditions or thresholds and excluding those cells not meeting the conditions or thresholds.

In accordance with an embodiment of the present invention, the self-optimization of the FNCL may be integrated with a self-optimization of intra-frequency NCL, if any, inter-frequency/inter-RAT NCL. By integrating the self-optimization of NCL and FNCL, it is possible to minimize a total amount of information (NCL and FNCL) to be broadcasted on broadcast control channel (BCCH) without degrading UE's handover performance.

In accordance with an embodiment of the present invention, a measurement event can be used for self-optimization of inter-frequency/inter-RAT NCL and FNCL. In an initial phase of network operation, for instance, network set-up measures events with lower threshold and more frequency to measure and trigger more measurement reports from the UE. Those reports may be used for self-optimization purpose. After the network 100 becomes stable, the network 100 may change measurement events with higher threshold, which may reduce the measurement reporting overhead in UE. Therefore, NCL planning work may become much easier, and guarantee LTE's HO performance.

Therefore, in the present invention, in accordance with at least one embodiment, improves user satisfaction as the probability to be in the best network improves. Furthermore, the present invention improves HO performance and cell reselection performance with minimum effort from the operator.

Figure 2:
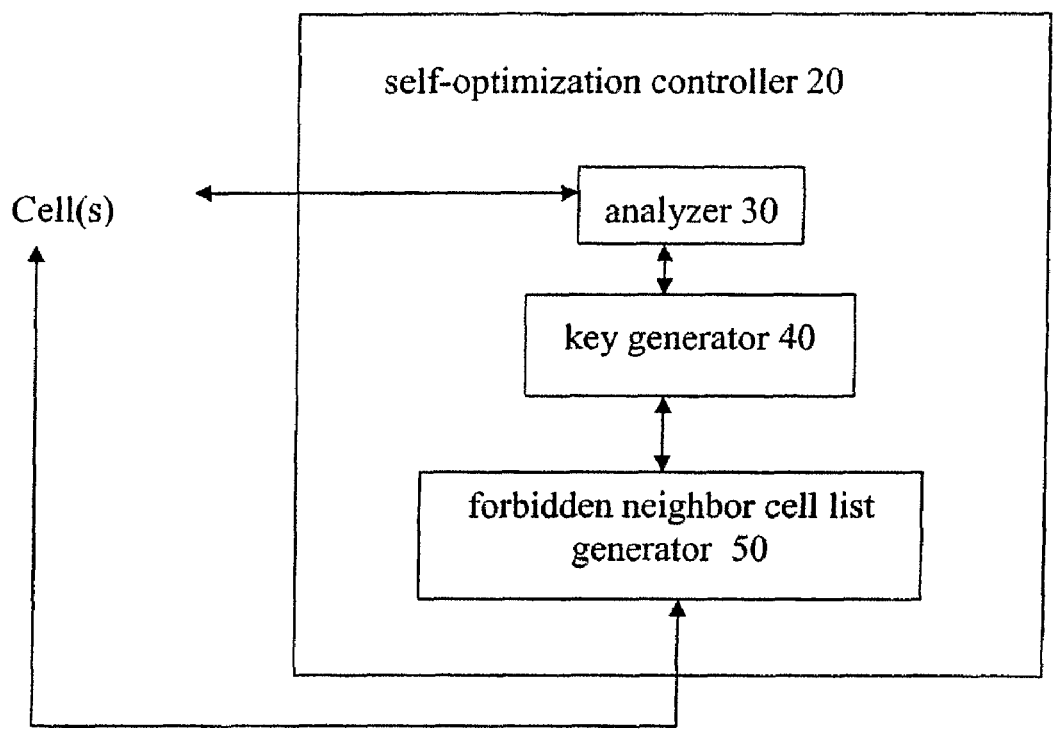
FIG. 2 illustrates a self-optimization controller, in accordance with an embodiment of the present invention.

FIG. 2 illustrates a self-optimization controller 20, in accordance with an embodiment of the present invention. The self-optimization controller 20 includes an analyzer 30 configured to collect measurements and statistics from each cell. A key generator 40 in the self-optimization controller 20 is configured to generate a key indicator based on the measurements and statistics collected from each cell against predetermined conditions or thresholds to identify at least one cell failing to meet the predetermined conditions or thresholds. The self-optimization controller 20 includes a forbidden neighbor cell list generator 50 configured to automatically generate a forbidden neighbor cell list identifying the at least one cell failing to meet the predetermined conditions or thresholds and notifying the at least one cell.

The initial measurements may be collected in a forbidden neighbor cell list of size zero or with an initial forbidden neighbor cell list including forbidden cells defined by an operator. A forbidden cell includes a cell to be excluded from connecting with a network element. As previously indicated, the key indicators are performance indicators collected during call establishment and during dedicated mode for each cell. The forbidden neighbor cell list generator 50 is also configured to output a signal to the at least one cell meeting the predetermined conditions or thresholds. The predetermined conditions may include predefined conditions defined by an operator for not deleting a particular cell from the forbidden neighbor cell list.

In addition, the analyzer 30 is configured to analyze a cell of a plurality of cells in the forbidden neighbor cell list and collect the measurements and statistics continuously or at predetermined time intervals. The forbidden neighbor cell list generator 50 is then configured to automatically update the forbidden neighbor cell list by adding or maintaining at least one cell failing to meet the predetermined conditions or thresholds and excluding a cell meeting the conditions or thresholds.

The predetermined time intervals may include an initial phase of network operation in which the key indicator includes a lower threshold and more frequency to measure and increase a number of updates of the forbidden neighbor cell list.

After the network 100 becomes stable, the key generator 40 generates the key indicator to include a higher threshold and reduce the number of updates of the forbidden neighbor cell list.

The forbidden neighbor cell list generator 50 is then configured to delete a cell from the forbidden neighbor cell list when the identifier determines that there is potential in the cell to work as a candidate for handovers and cell reselection. The forbidden neighbor cell list generator 50 transmits neighbor cell specific configuration to a network element using the forbidden neighbor cell list. In addition, the forbidden neighbor cell list generator 50 may generate the forbidden neighbor cell list to comprise user specific or subscription specific information associated with a particular network element.

Figure 3:
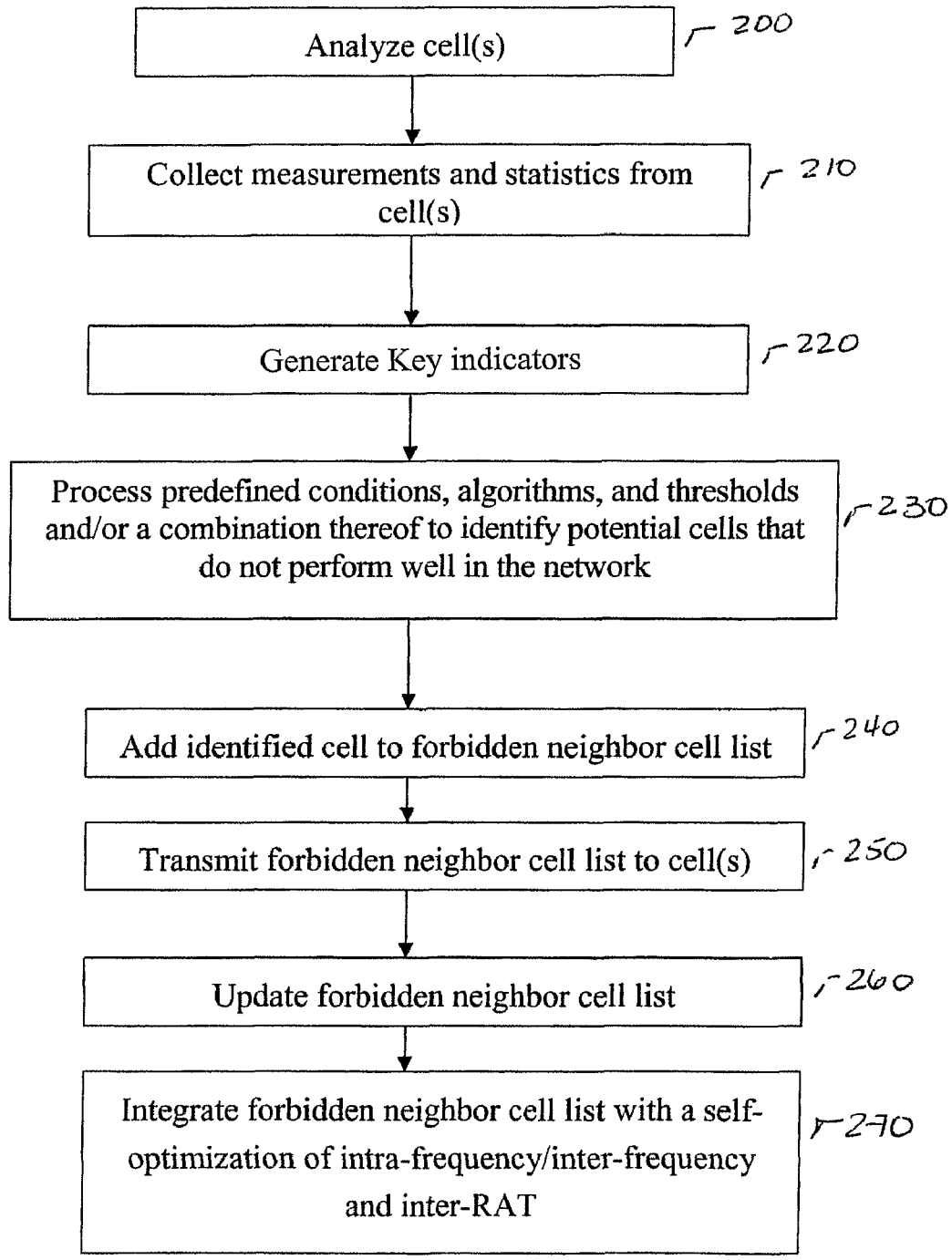
FIG. 3 illustrates a flow diagram of a self-optimization forbidden neighbor cell list method, according to an embodiment of the present invention.

FIG. 3 illustrates a flow diagram of a self-optimization FNCL method, according to an embodiment of the present invention. As shown in FIG. 3, at step 200, a cell of a plurality of cells is analyzed. At step 210, measurements and statistics are collected from each cell. At step 220, key indicators are generated.

Based on these key indicators or a combination thereof, at step 230, the method includes processing at the self-optimization controller 20 predefined conditions, algorithms, and thresholds and/or a combination thereof to identify the potential cells that do not perform well in the network. At step 240, the selected cells are added autonomously and/or automatically to the FNCL. At step 250, the self-optimized FNCL is transmitted to each cell that was analyzed. At step 260, update cells from the FNCL when an algorithm and/or rules determine and/or define that there is potential in a newly uncover cell to work as a candidate for handovers and cell reselections. In the alternative, a cell already included in the FNCL may be deleted if determined that such cell may no longer work as a candidate for handovers and cell reselections. In accordance with an embodiment of the present invention, at step 270, the self-optimization of the FNCL may be integrated with a self-optimization of intra-frequency/inter-frequency and inter-radio access technology (RAT) measurements.

Figure 4:
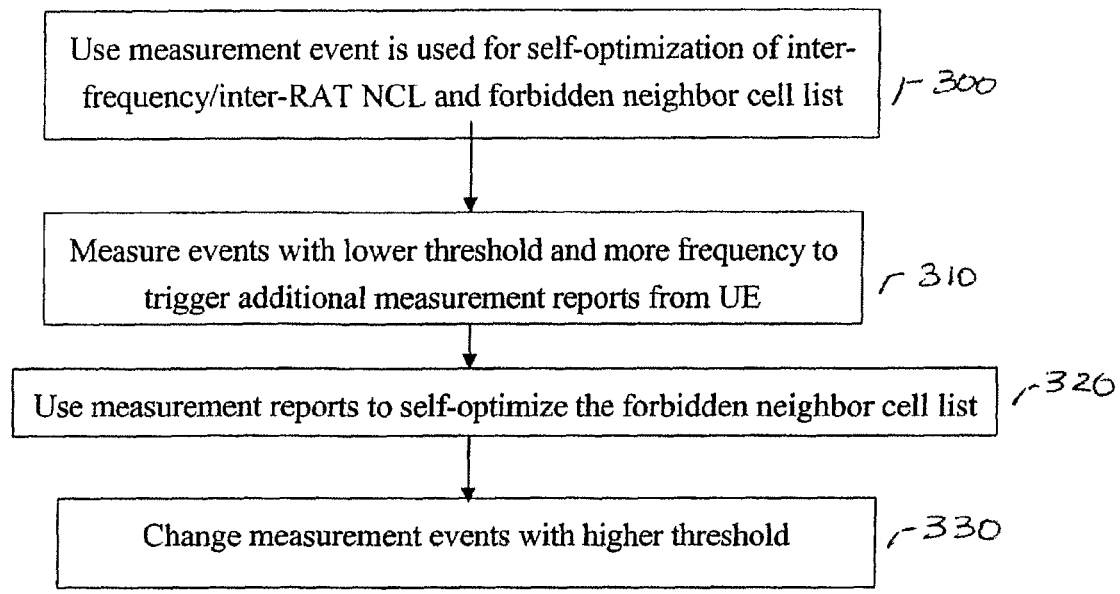
FIG. 4 illustrates a flow diagram of a method, in accordance with an additional embodiment of the present invention.

FIG. 4 illustrates a flow diagram of a method, according to an alternative embodiment of the present invention. At step 300, a measurement event is used for self-optimization of inter-frequency/inter-RAT NCL and FNCL. At step 310, in an initial phase of network operation, the events are measured with lower threshold and more frequency to trigger additional measurement reports from the UE. At step 320, the measurement reports are used to self-optimize the FNCL. After the network becomes stable, at step 330, the method changes measurement events with higher threshold, which may reduce the measurement reporting overhead in UE.

It is to be understood that in the embodiment of the present invention, the steps are performed in the sequence and manner as shown although the order of some steps and the like may be changed without departing from the spirit and scope of the present invention. In addition, the methods described in FIGS. 2 and 3 may be repeated as many times as needed.

Figure 5:
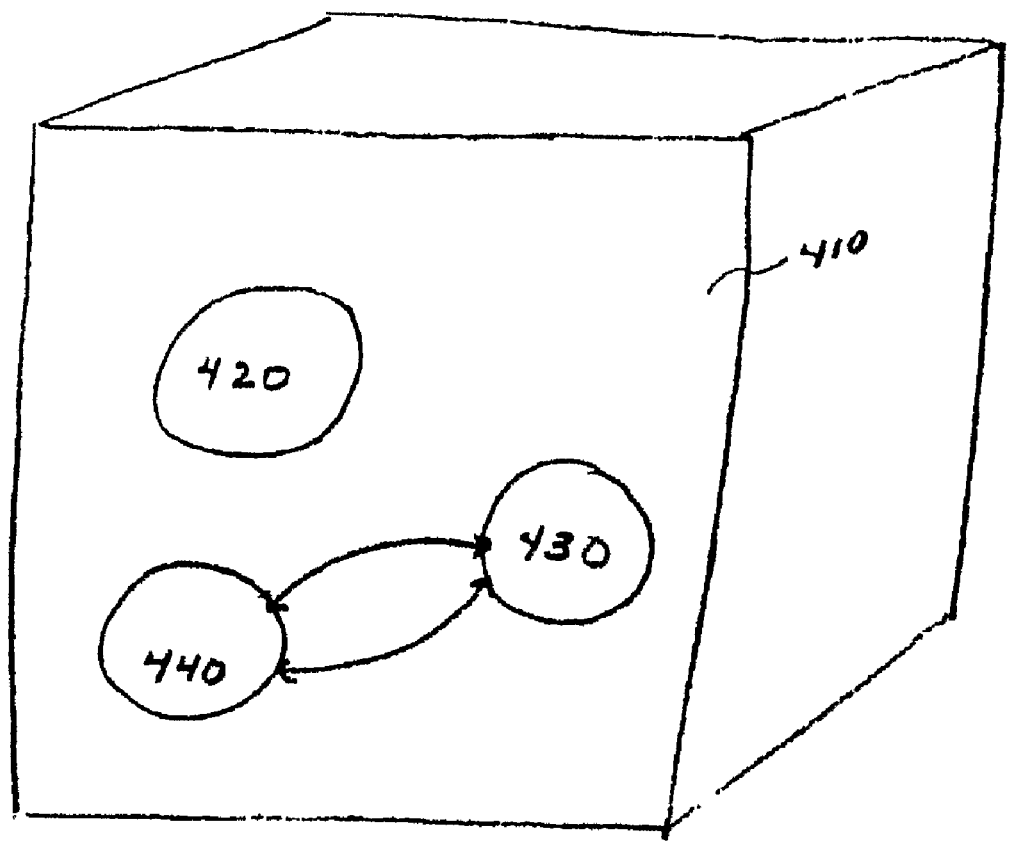
FIG. 5 illustrates an embodiment of the invention that is a computer program product embodied on a computer-readable medium, in accordance with an additional embodiment of the present invention.

FIG. 5 illustrates an embodiment of the invention that is a computer program product embodied on a computer-readable medium, encoding instructions for performing at least the methods described in FIGS. 2 and 3. The computer program product can be embodied on a computer readable medium 410. The computer program product can include encoded instructions for processing 420 a forbidden neighbor cell list 430, which may also be stored on the computer readable medium 410. The computer program product can include encoded instructions for performing 440 self-optimization procedures for the forbidden neighbor cell list 430.

As shown in FIG. 5 the computer program product can be implemented in hardware, software, or a hybrid implementation. The computer program product can be composed of modules that are in operative communication with one another, and which are designed to pass information or instructions to a communications device such as a user equipment or network node. The computer program product can be configured to operate on a general purpose computer or an application specific integrated circuit (ASIC).

With respect to the present invention, network elements may be any device that utilizes network data, and can include switches, routers, bridges, gateways or servers. In accordance with an embodiment of the present invention, various network elements such as computers (fixed or portable), mobile stations, mobile telephones, and personal data assistants or organizers are known to those skilled in the art which may be used as a user equipment (UE).

In addition, while the term data has been used in the description of the present invention, the invention has import to many types of network data. For purposes of this invention, the term data includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and step illustrated and described, and accordingly all suitable modifications and equivalents may be resorted to, falling within the scope of the invention.

The invention claimed is:

1. An apparatus, comprising:
    an analyzer configured to collect measurements and statistics from a cell of a plurality of cells;
    a key generator configured to generate a key indicator based on the measurements and statistics collected from the cell against predetermined conditions or thresholds to identify at least one other cell failing to meet the predetermined conditions or thresholds; and
    a forbidden neighbor cell list generator configured to automatically generate a forbidden neighbor cell list identifying the at least one other cell failing to meet the predetermined conditions or thresholds and notifying the at least one other cell,
    wherein the measurements are initially collected in a forbidden neighbor cell list of size zero or with an initial forbidden neighbor cell list comprising forbidden cells defined by an operator, wherein a forbidden cell comprises a cell to be excluded from connecting with a network element.

2. The apparatus as recited in claim 1, wherein the key indicator is performance indicator collected during call establishment and during dedicated mode for the cell.

3. The apparatus as recited in claim 1, wherein the forbidden neighbor cell list generator is further configured to output a signal to the at least one other cell meeting the predetermined conditions or thresholds.

4. The apparatus as recited in claim 1, wherein the predetermined conditions comprise predefined conditions defined by an operator for not deleting a particular cell from the forbidden neighbor cell list.

5. The apparatus as recited in claim 1, wherein the analyzer is further configured to analyze the cell in the forbidden neighbor cell list and collect the measurements and statistics continuously or at predetermined time intervals.

6. The apparatus as recited in claim 5, wherein the forbidden neighbor cell list generator is further configured to automatically update the forbidden neighbor cell list by adding or maintaining the at least one other cell failing to meet the predetermined conditions or thresholds and excluding a cell meeting the conditions or thresholds.

7. The apparatus as recited in claim 6, wherein the predetermined time intervals comprise an initial phase of network operation in which the key indicator comprises a lower threshold and more frequency to measure and increase a number of updates of the forbidden neighbor cell list.

8. The apparatus as recited in claim 6, wherein after a network becomes stable, the key generator is configured to generate the key indicator to comprise a higher threshold and reduce the number of updates of the forbidden neighbor cell list.

9. The apparatus as recited in claim 1, wherein the forbidden neighbor cell list generator is further configured to delete a cell from the forbidden neighbor cell list when an identifier determines that there is potential in the cell to work as a candidate for handovers and cell reselection.

10. The apparatus as recited in claim 1, wherein the forbidden neighbor cell list comprises a cell comprising hardware problems, a cell that is in a different country than a network element, a cell outside a serving public land mobile network, a cell to exclude handover, and a cell that belongs to an operator that is different from an operator corresponding to the network element.

11. The apparatus as recited in claim 1, wherein the forbidden neighbor cell list generator is further configured to transmit a neighbor cell specific configuration to a network element using the forbidden neighbor cell list.

12. The apparatus as recited in claim 1, wherein the forbidden neighbor cell list generator is further configured to generate the forbidden neighbor cell list to comprise user specific or subscription specific information associated with a particular network element.

13. The apparatus as recited in claim 1, wherein the apparatus comprises a radio network controller or an enhanced base station.

14. A method, comprising:
    collecting measurements and statistics from a cell of a plurality of cells;
    generating a key indicator based on the measurements and statistics collected from the cell against predetermined conditions or thresholds to identify at least one other cell failing to meet the predetermined conditions or thresholds;
    automatically generating a forbidden neighbor cell list identifying the at least one other cell failing to meet the predetermined conditions or thresholds and notifying the at least one other cell; and
    collecting the measurements in a forbidden neighbor cell list of size zero or with an initial forbidden neighbor cell list comprising forbidden cells defined by an operator, wherein a forbidden cell comprises a cell to be excluded from connecting with a network element.

15. The method as recited in claim 14, further comprising:
    configuring the key indicator to comprise performance indicators collected during call establishment and during dedicated mode for the cell.

16. The method as recited in claim 14, further comprising:
    outputting a signal to the at least one other cell meeting the predetermined conditions or thresholds.

17. A system, comprising:
    a plurality of cells configured to communicate with operations and maintenance of a network and provide communication service for a number of network elements; and
    a self-optimization controller configured to collect measurements and statistics from a cell of a plurality of cells, configured to generate a key indicator based on the measurements and statistics collected from the cell against predetermined conditions or thresholds to identify at least one other cell failing to meet the predetermined conditions or thresholds, and configured to automatically generate a forbidden neighbor cell list identifying the at least one other cell failing to meet the predetermined conditions or thresholds and notifying the at least one other cell,
    wherein the measurements are initially collected in a forbidden neighbor cell list of size zero or with an initial forbidden neighbor cell list comprising forbidden cells defined by an operator, wherein a forbidden cell comprises a cell to be excluded from connecting with a network element.

18. The system as recited in claim 17, further comprising:
    an enhanced base station configured to provide a long term evolution air interface and configured to perform radio resource management for an evolved access system.

* * * * *